Oct. 17, 1933.  R. H. MOULTON  1,930,687
SHOCK ABSORBER
Filed Nov. 5, 1928  2 Sheets-Sheet 1

Inventor
Rollin H. Moulton,
By Wilkinson, Huxley, Byron & Knight
Attys

Oct. 17, 1933.　　　R. H. MOULTON　　　1,930,687
SHOCK ABSORBER
Filed Nov. 5, 1928　　　2 Sheets-Sheet 2
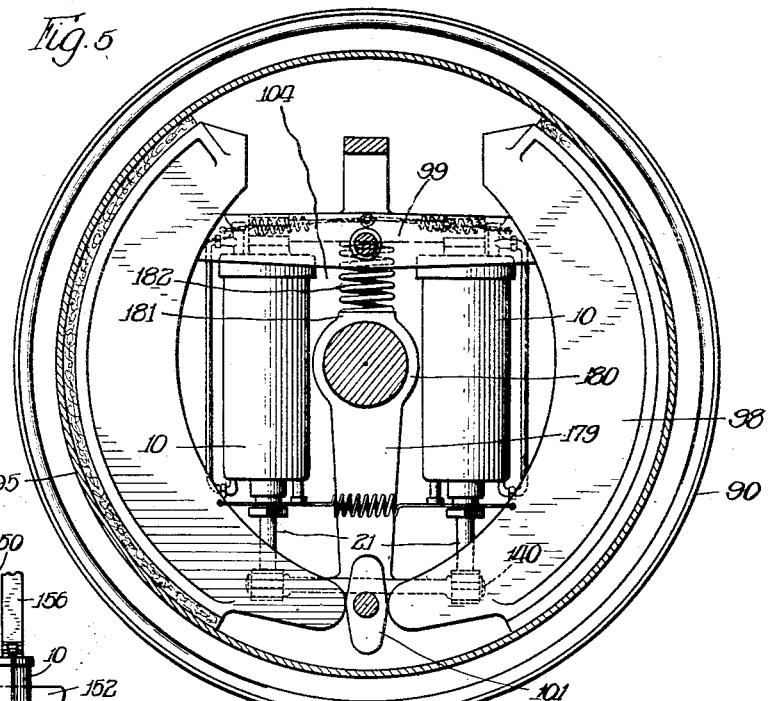
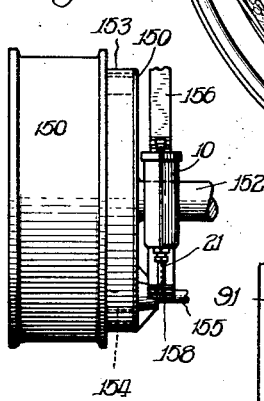
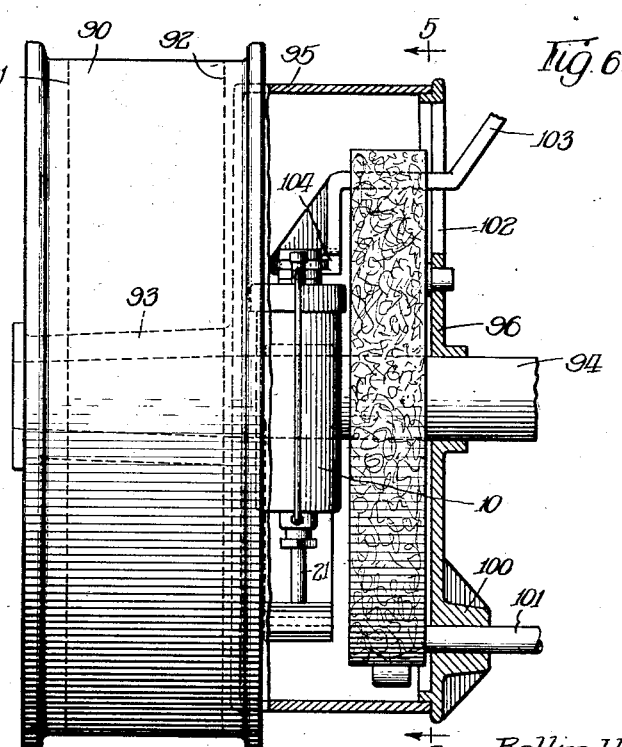
Inventor:
Rollin H. Moulton, Patented Oct. 17, 1933

1,930,687

UNITED STATES PATENT OFFICE 1,930,687

SHOCK ABSORBER

Rollin H. Moulton, Berwyn, Ill.

Application November 5, 1928. Serial No. 317,183

18 Claims. (Cl. 188—88)

This invention pertains to shock absorbers or cushioning devices, and more particularly to that class of devices adapted to be used on road vehicles, airplanes, track vehicles, or in fact between any parts having relative movement therebetween where it is desired to retard or cushion the movements between said parts.

In shock absorbers now in use, there are a great many of the so-called hydraulic type. Some of the finer of this type are double acting, but at the expense of added weight and finer fitted parts to prevent leakage and insure practical operation. This type of shock absorber is necessarily quite expensive, and in fact the expense is such as to be almost prohibitive for cars of the cheaper type. There are other well-known types of hydraulic shock absorbers which do not involve the snubbing action or employ only the snubbing action. In other words, they are not double acting, and even with such devices, the cost is not within the price range of mechanical snubbers though it is admitted the hydraulic shock absorbers are decidedly advantageous and desirable. Further, even the most expensive shock absorbers do not provide means for increasing the snubbing action which is desirable especially in heavy duty work; that is, the movement in either direction is balanced, which is oftentimes not desirable and does not meet particular needs.

In heavy duty work, such as in airplanes and trucks, it is frequently very difficult to procure a cushioning device which in itself is powerful enough to correctly transmit or dissipate shocks between the relatively movable parts. This will be appreciated when it is considered that there are limits to which the ordinary cushioning device can be designed. Not only that, but the sizes of the devices are limited by adjacent parts. It is therefore desirable in many instances to provide means whereby a plurality of cushioning devices may be employed to have moving parts to multiply the cushioning effect of a single cushioning device, and further, it may be desirable that the plurality of devices shall act at the same point.

It is therefore an object of the invention to provide a cushioning device utilizing a fluid as an absorber medium.

Another object is to provide a device for effectively cushioning shocks between parts from a plurality of directions.

Yet another object is to provide a double acting checking or cushioning device using a plurality of checks in each direction of operation, and one which combines the action of a shock absorber and a snubber.

Still another object is to provide cushioning devices which may be closely associated to absorb the same shocks, forces or the like between relatively movable parts, the same acting to receive said forces from the same point.

A further object is to provide a cushioning device wherein it is possible to vary the resistance to operation in either direction.

A still further object is to provide a cushioning device readily adaptable to all uses, as on road vehicles, railroad draft gear, between parts of track vehicles having relative movement, airplanes, engines or other prime or secondary movers and their beds, in fact, between any parts having relative movement, to cushion or check said parts in operation thereof.

Yet further objects are to provide a fluid cushioning device of lighter and sturdier structure than those used, one in which little wear takes place, one that is easy to manufacture and requires little or no attention once installed, one which more adequately meets service conditions, and one which is inexpensive to make and maintain and fulfills all requirements of service and manufacture.

A different object is to provide cushioning devices which may be associated with wheels of vehicles and are applied thereto in such a manner as will offer no interference with any operating gear associated with the wheels or axles of said vehicles.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 5 is a sectional elevation of a modified form of assembly of cushioning devices, showing the same as associated with a wheel and brake drum assembly, the same being taken substantially in the plane as indicated by the line 5—5 of Figure 6;

Figure 6 is a side elevation, partly in section, of the assembly illustrated in Figure 5, the same being taken at right angles to said figure; and Figure 7 is a side elevation of a modified form of wheel, brake drum and cushioning device assembly.

Figure 1:
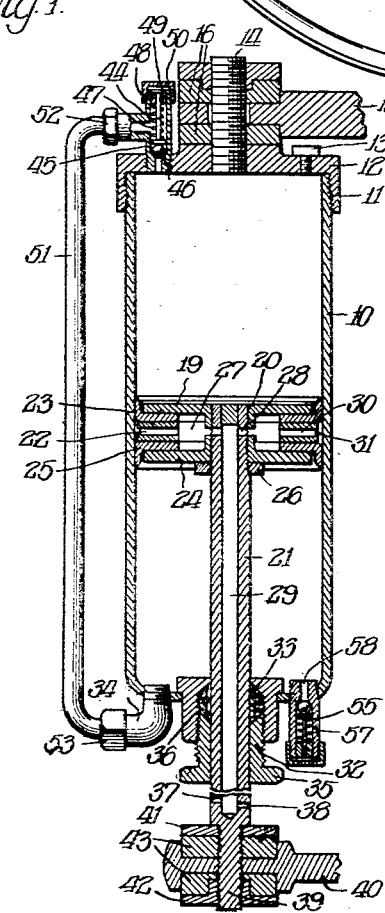
Figure 1 is an enlarged sectional elevation of the cushioning or shock absorbing device per se.
Figure 3:
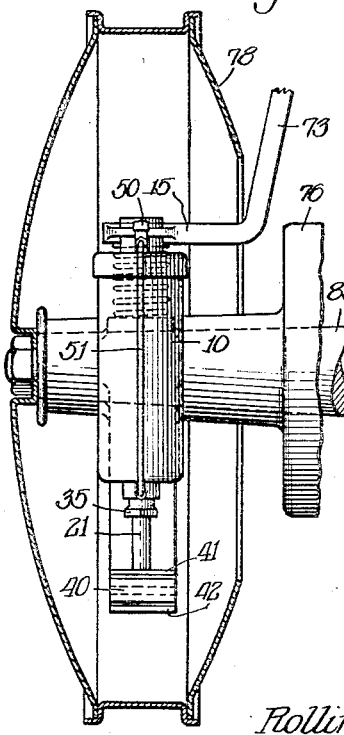
Figure 3 is a sectional elevation of the wheel and shock absorbing assembly illustrated in Figure 1, the same being taken substantially at right angles to the view shown in Figure 1.

Referring first of all more particularly to the shock absorbing or cushioning device per se, it will be seen that the same is substantially the same as that shown in copending application, Serial No. 290,624, filed July 5, 1928, and of which this application may be considered as a continuation in part. The device as particularly illustrated in Figure 1, consists essentially of a cylinder 10 threaded as at 11 for the reception of the cap 12, said cap being provided with lubricating means 13 which may take the form of a removable screw, and said cap is also provided with an upstanding threaded screw 14 adapted to form securing means with a portion of a crosshead 15, said means including rubber cushioning members 16 disposed on either side of a portion of the crosshead 15 and retained by a nut to form a rubberized substantially universal joint, it being understood that the crosshead 15 may be secured to the body or strut of a vehicle, airplane and the like, or to any moving part.

A piston 18 is provided in the cylinder, said piston in its normal position being substantially centered as shown, and said piston may consist of an upper retaining plate 19 screwthreaded as at 20 to the piston rod 21. Between the retaining plate 19 and a spacing ring 22, a piston leather 23 is provided having an upwardly extending annular or flange portion having sliding engagement with the cylinder 10, and between this spacing ring and a bottom plate 24 there is provided a similar leather 25 having a downwardly extending annular portion having sliding engagement with the cylinder walls, said assemblage being provided with an adjusting nut 26 threaded to the piston rod 21 for maintaining the parts of the assemblage in proper operative position with respect to each other.

The assemblage shown is provided with a channel or recess 27 in the piston head, the same communicating through apertures 28 with the channel 29 in the hollow piston rod 21, and the spacing ring 22 is also provided with channels or apertures 30 leading to the walls of the cylinder and having portions 31 communicating with the leathers 23 and 25. The piston rod 21 passes through a gland or stuffing box 32 in the base of the cylinder, the same being of any construction, such as the nut 33 which may be welded or screw threaded to the bottom of the cylinder, said nut having threaded engagement with an adjustable nut 35, between which nuts the packing 36 may be disposed. The channel 29 adjacent the lower portion of the piston rod may be vented to the atmosphere by means of apertures 37 and 38, said piston rod being preferably threaded as at 39 and adapted to be secured to a portion of the crosshead 40 by means of upper and lower nuts 41 and 42, rubber insulation 43 providing a rubberized substantially universal joint. The crosshead 40 then may be secured to any means 79 for attachment to the axle or a part relatively movable with respect to the part to which the crosshead 15 is secured.

Means may be provided for increasing the resistance to movement of the piston in one direction of travel, say for instance, the rebound or snubbing direction, which means may consist of a valve member 44 consisting essentially of a housing 45 carried by the cap 12 and communicating with the upper portion of the cylinder above the piston, the housing being provided with a valve member 46 spring controlled by means of the plunger 47 in engagement therewith and a spring 48, adjusting means 49 being provided for imparting adjustment to the spring 48, a cap 50 serving to complete the assembly to prevent any misadjustment or interference with the parts. A conduit 51 is secured to the housing 45 and communicates with said housing above the valve 46, a suitable connection 52 maintaining the housing and conduit in operable relation. The conduit extends downwardly and is secured by a suitable joint 53 to a fitting 34 communicating with the bottom of the cylinder on the under side of the piston. A check valve 55 of substantially the same type as the valve 44 is provided in the base of the cylinder communicating with the under side of the piston, said valve communicating with the atmosphere as at 57 and with the bottom of the cylinder as at 58.

It will be appreciated that the spring 48 mounted over the valve 46 is adjusted in such a manner that the valve will not open until a predetermined pressure is developed on the upper side of the piston. Normally this valve is held closed by the spring above it and opens in the same manner and under the same conditions that obtain in the above referred to application. In a similar manner, the spring in the valve 55 is adjusted so that proper bleeding action takes place.

Figure 4:
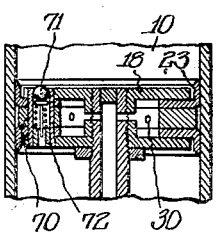
Figure 4 is an enlarged fragmentary sectional elevation through a portion of the cylinder and piston of a modified form of cushioning device.

The device is made double acting in a manner described in the above referred to application, in which a valve assembly 44 is applied to the cylinder below the piston and communicates with the top of the cylinder through a fitting similar to the conduit 51 and the fitting 54. In the modification illustrated in Figure 4, the valve 54 and conduit 51 are dispensed with and a valve assembly 70 is provided in the piston 18 permitting flow of fluid through the piston from the upper half of the cylinder to the lower half (to correspond to the device shown in Figure 1) after predetermined pressure has been built up in the upper half of the cylinder due to the travel of the piston 18 upwardly. The valve may consist essentially of a valve member 71 normally seated by the spring pressed plunger 72. This device may be adapted for heavy duty work, that is, may be made double acting by providing a valve assembly 70 opening in an opposite direction through the piston. As before, the resilient members operating the valve 70 are properly weighted with respect to the bleed corresponding to the bleed 55 to permit proper actuation of the device.

In the operation of this device, let it be assumed that the piston is moved upwardly with respect to the cylinder. The air above the piston will be compressed until such time as it overcomes the tension in the spring 48, at which time the valve 46 will be opened, and instead of the exhausted air passing to the atmosphere, it will now pass through the conduit 51 to the under side of the piston for increasing the pressure of the air therein. Upon the initial movement of the piston upwardly and before the air pressure has opened the valve 46, the pressure of the air below the piston is decreased, tending to form a vacuum. However this is broken by air being drawn through the ports 37 and 38, through the channel 29, through apertures 28 into the space 27 and through the channel 22, past the lower leather 25 and into the lower portion of the cylinder. When however such pressure has been built up in the upper portion of the piston to open the valve 46, as before explained, air will pass through the conduit 51 to the under side of the piston. However air is not drawn in through the hollow piston rod and then to the under side of the piston as the compressed air is forced into the cylinder under the piston for obviously the compressed air has the effect of sealing the lower leather against the side of the cylinder. So it will be seen that with the pressure of the air on the under side of the piston thus built up to a point above atmospheric pressure (and this can be made of any practical value), that the piston 18 in its downward movement will have no free rebound as such is immediately resisted in its downward movement by the compressed air trapped in the lower portion of the piston which cannot return through the valve 46 as it is a one-way valve. The piston however in going down or returning, forces the compressed air out through the bleed valve 55. Therefore it will be readily understood that in this form of the device, compressed air is supplied only to the lower portion of the cylinder, and so, with regard to pressures, this device in this sense is not double acting. It is however double acting in regard to the ordinary shock absorbing and snubbing actions as described in the above identified application. It will be readily appreciated that if the valve mechanism and conduit be reversed that the action is reversed, that is, the shock absorbing motion is arrested by initial compressed air rather than the snubbing as described.

Figure 2:
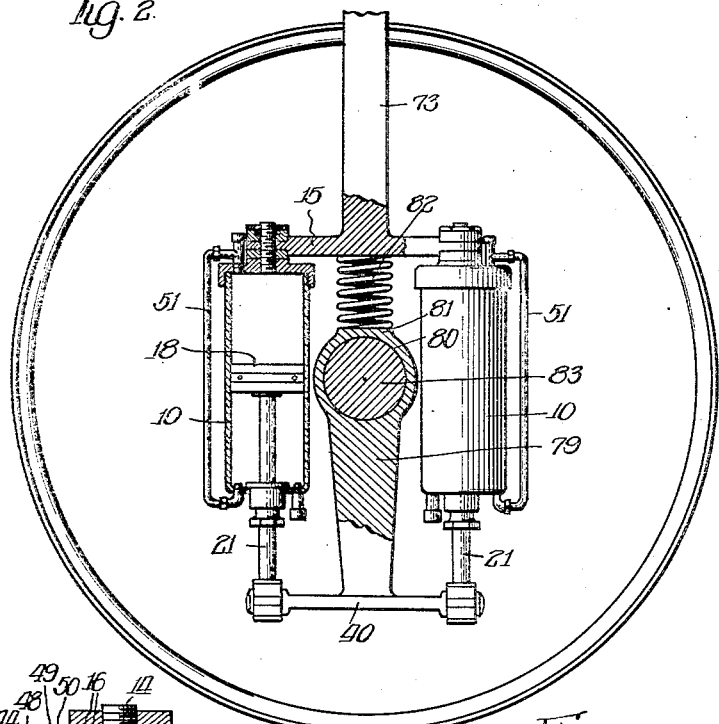
Figure 2 is an elevation, partly in section, showing the application of a plurality of the shock absorbing devices illustrated in Figure 1 to a wheel, the same being shown as disposed within the plane of said wheel.

In the application of such a cushioning device to the wheel of a vehicle, such as particularly illustrated in Figure 2, the crosshead 15 includes a plurality of arms extending on either side of the axle 83 for supporting a plurality of cushioning devices, preferably of the form as above described. The crosshead 15 is preferably a part of the strut 73 and extends within the plane of the wheel 74 which is shown as of the disc type. The wheel is provided with a hub 75 provided with a brake drum 76, it being seen that the strut clears the drum. The wheel may be provided with a plurality of discs 77 and 78, the inner disc terminating short of the strut, permitting relative movement between the strut and the axle. The piston rods 21 are secured in a manner as already described to parts of the crosshead 40 which is provided with an upstanding portion 79 provided with a bearing 80 loosely supported on the hub 75 and permitting relative movement of said hub with respect to the crosshead 40. The member 80 is provided with a spring seat 81 permitting the mounting of the positioning spring 82 between said seat and the corresponding seat on the crosshead 15.

In the operation of this form of the assemblage, it will be seen that normally the spring 82 serves to space the strut 73 from the axle 83 in such a position as to center the pistons 18. Relative movement between the axle and the strut will serve to move the pistons 18 in one direction or another, causing operation of the cushioning device such as already described, the spring 82 serving to tend to return the strut and the axle to normal position after the shocks have been absorbed or dissipated.

Referring now more particularly to Figures 5 and 6, the wheel 90 is shown of the wire wheel type, the lines of spokes being indicated at 91 and 92, the wheel being provided with a hub 93 for revolubly mounting said wheel on the fixed axle 94, the hub and wheel being provided with a brake drum 95. The axle is provided with a plate 96 non-rotatably mounted thereon, said plate serving to pivotally support the brake shoes 98 as at 97 through the bracket 99 and also to provide a bearing 100 for actuating mechanism 101 for said brake shoes. The plate is slotted as at 102 for the reception of a portion of the strut 103, said strut entering the drum, clearing the drum mechanism, and having a crosshead 104 provided between the brake shoes and the wheel. The crosshead 104 is similar to the crosshead 15 and serves as a support for the cylinders 10 of the cushioning devices. The piston rods 21 are mounted on the crosshead 140, which crosshead is provided with the upstanding member 179 terminating in a member 180 supported on the axle 94 either integral therewith or loosely thereon. Centering spring 182 is provided between the spring seat 181 of the member 180 and the crosshead 104, and it will be understood that the action of the device is exactly the same as has been already described.

In Figure 7, the wheel 150 is provided with a brake drum 151, said wheel being revolubly mounted on the fixed axle 152. As before, the brake mechanism carrying plate 153 cooperates with the drum 151 and serves to support the brake shoes 154 and the operating mechanism 155 therefor. The strut 156 is disposed externally of the brake drum and is provided with a crosshead 157 supporting the cylinders 10 of the cushioning devices disposed on both sides of said axles, the pistons 21 of said cushioning devices being mounted on the crosshead 158, said crosshead either being mounted on the axle 152 or on the plate 153 loosely or integrally with either of said members, and a resilient member corresponding to the spring 82 is mounted between the crosshead 157 and the axle 152 to normally maintain the strut and axle in relatively operative positions.

As before, the operation of the device is similar to that already described.

In the event that it is desired to mount one of the aforementioned devices on a pivoted wheel, as on the front wheel of an automobile, it is only necessary to pivot the crosshead with respect to the strut so that the cushioning devices will follow the wheel or drum when such is necessary.

It is to be understood that I do not wish to be limited by the exact embodiments of the device shown, which are merely by way of illustration and not limitation, as various and other forms of the device will of course be apparent to those skilled in the art without departure from the spirit of the invention or the scope of the claims.

I claim:

1. In a cushioning system, the combination of a wheel, a member associated with said wheel, and means for cushioning forces, shocks and the like in a plurality of directions transmitted through said wheel and associated member, said means including a plurality of cushioning devices disposed within the plane of said wheel.

2. In a cushioning device, the combination of an axle, a wheel rotatably mounted thereon, a member rotatively associated with said wheel and having a crosshead thereon, a member movable with respect to said wheel and resiliently mounted on said first named member and having a crosshead thereon, and cushioning devices disposed between and carried by said members.

3. In a cushioning device, the combination of an axle, a wheel rotatively mounted thereon, a member rotatively associated with said wheel and having a crosshead thereon, a member movable with respect to said wheel and resiliently mounted on said first named member and having a crosshead thereon, and cushioning devices disposed between and carried by said members, said cushioning devices being disposed within said wheel.

4. In a cushioning device, the combination of an axle, a wheel rotatively mounted thereon, a member rotatively disposed in said wheel and having a crosshead thereon, a member movable with respect to said wheel and resiliently mounted on said first named member and having a crosshead thereon disposed within said wheel, and cushioning devices disposed between and carried by said members, said cushioning devices being disposed within said wheel and on both sides of said axle.

5. In a cushioning device, the combination of an axle, a wheel rotatively mounted thereon, said wheel having a brake drum associated therewith, a member associated with said axle and having a crosshead thereon, a member movable with respect to said wheel and resiliently mounted on said first named member and having a crosshead thereon, and cushioning devices disposed between and carried by said members.

6. In a cushioning device, the combination of an axle, a wheel rotatively mounted thereon, said wheel having a brake drum associated therewith, a support associated with said axle, a member movable with respect to said axle and having a support thereon, said member having a resilient member disposed between said axle and said member, and cushioning devices located between said supports and on both sides of said axle.

7. In a cushioning device, the combination of a cylinder, a piston movable therein, a piston rod for moving with said piston, said rod and piston having means for supplying fluid to said cylinder, and means in said piston for by-passing fluid from one side of said piston to the other in said cylinder.

8. In a cushioning device, the combination of a cylinder having means for attachment to a support, a piston movable therein and having a piston rod having means thereon for attachment to a support movable with respect to said first named support, said piston and rod having means therein for permitting fluid supply of fluid from a source external of said cylinder to one side of said piston upon movement thereof, an exhaust valve associated with said cylinder, and means in said piston for by-passing fluid from one side of said piston to the other in said cylinder to thereby build an initial excess pressure to resist opposite movement of said piston.

9. In a cushioning device, the combination of a wheel and axle assembly, brake drum means associated with said assembly, a member movable with respect to said assembly, means cooperating with said assembly and said member to normally maintain the same in a predetermined position, and cushioning means within said drum means and cooperating with said assembly and said member.

10. In a cushioning device, the combination of an axle, a wheel rotatively mounted thereon, said wheel having a brake drum associated therewith, a member associated with said axle and having a cross head thereon, a member movable with respect to said wheel and resiliently mounted on said first named member and having a crosshead thereon, and cushioning devices disposed between and carried by said members, said cushioning devices being disposed within said brake drum.

11. In a cushioning device, the combination of an axle, a wheel rotatively mounted thereon, said wheel having a brake drum associated therewith, a member associated with said axle and disposed in said brake drum, and cushioning devices disposed between and carried by said members, said cushioning devices being disposed within said brake drum and on both sides of said axle.

12. In a cushioning device, the combination of an axle, a wheel rotatively mounted thereon, said wheel having a brake drum associated therewith, brake mechanism in said drum, a member associated with said axle and having a crosshead thereon, a member movable with respect to said wheel and resiliently mounted on said first named member and having a crosshead thereon, and cushioning devices disposed between and carried by said members and located between said brake mechanism and said wheel.

13. In a cushioning device, the combination of an axle, a wheel rotatively mounted thereon, a member resiliently supported with respect to said axle and within the plane of said wheel, and cushioning means disposed between said member and said axle and within the plane of said wheel.

14. In a cushioning device, the combination of a cylinder, a piston relatively movable therein, a piston rod connected to said piston and extending outwardly of said cylinder, means for causing flow of fluid into said cylinder from the atmosphere through said piston rod upon movement of said piston in either direction, and means for passage of fluid from one side of said cylinder to the other through said piston.

15. In a cushioning device, the combination of a cylinder, a piston relatively movable therein, a piston rod connected to said piston and extending outwardly of said cylinder, means for causing flow of fluid through said piston rod into said cylinder from a source other than said cylinder upon movement of said piston in either direction, and means for passage of fluid from one side of said cylinder to the other through said piston.

16. In a cushioning device, the combination of a cylinder, a piston relatively movable therein, means associated with said piston for causing flow of fluid into said cylinder from a source other than said cylinder upon movement of said piston in either direction, and means for passage of fluid from one side of said cylinder to the other through said piston.

17. In a cushioning device, the combination of a cylinder, a piston relatively movable therein, a piston rod connected to said piston and extending outwardly of said cylinder, means for causing flow of a fluid through said piston rod from a source other than said cylinder into either side of said cylinder from which the piston is travelling, and means for passage of fluid from one side of said cylinder to the other through said piston.

18. In a cushioning device, the combination of an axle, a wheel rotatively mounted thereon, said wheel having a brake drum associated therewith, a member associated with said axle and disposed in said brake drum, a member resiliently supported by said first named member, and cushioning means within said brake drum and associated with said members.

ROLLIN H. MOULTON.